Jan. 30, 1968  P. C. TABOR  3,366,416
LOCK RELEASE ADJUSTMENT CLIP
Filed Oct. 4, 1965
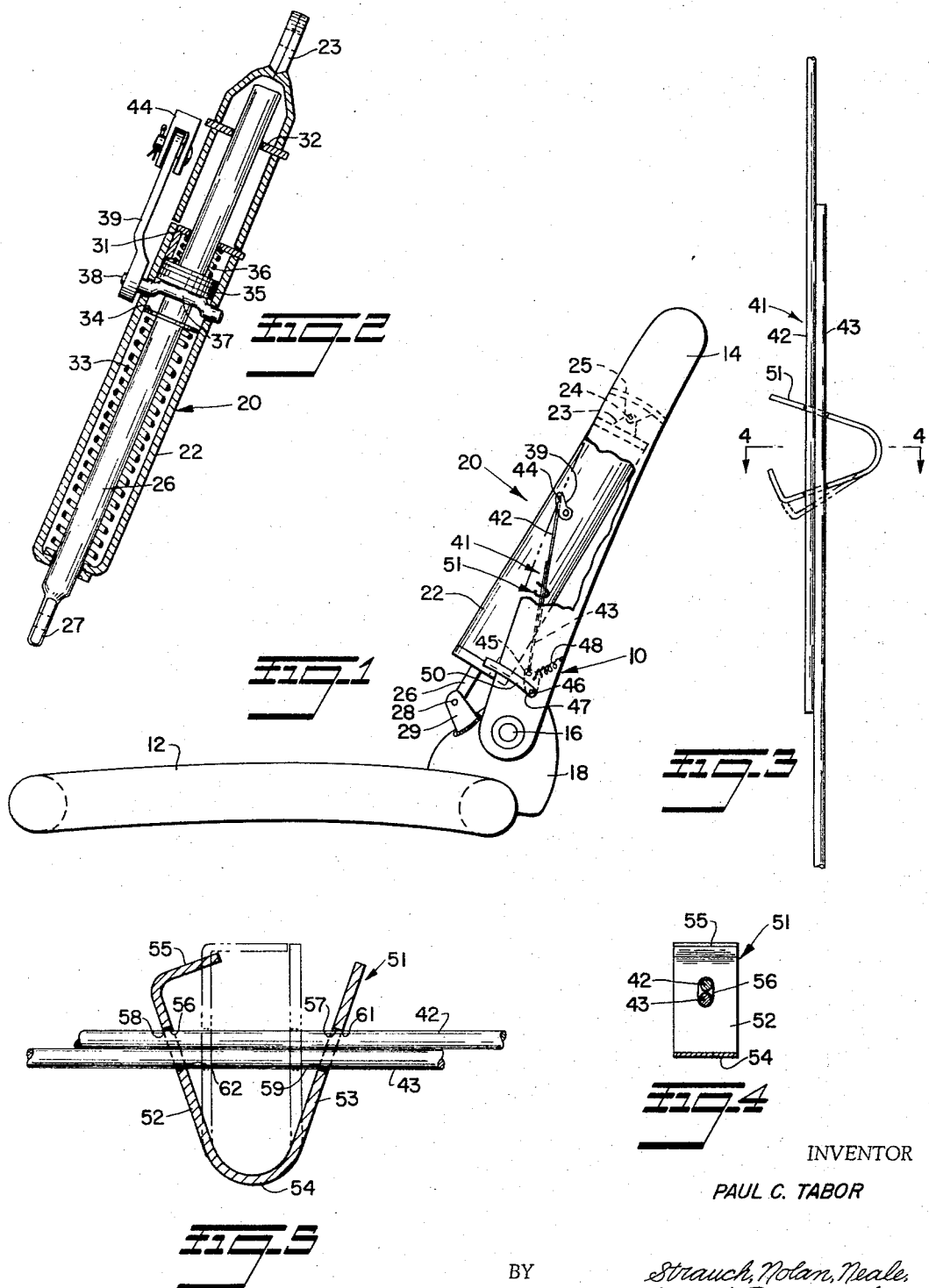
INVENTOR
PAUL C. TABOR
BY *Strauch, Nolan, Neale,
Nies & Bronaugh*
ATTORNEYS

United States Patent Office 3,366,416
Patented Jan. 30, 1968

3,366,416
LOCK RELEASE ADJUSTMENT CLIP
Paul C. Tabor, Clawson, Mich., assignor to Rockwell-Standard Corporation, Pittsburgh, Pa., a corporation of Delaware
Filed Oct. 4, 1965, Ser. No. 492,660
10 Claims. (Cl. 297—361)

The present invention refers to adjustable length linkages such as are used to operate seat locking devices and like mechanisms, and more in particular to spring clamp means to secure the linkage in each adjusted position.

In a linkage actuated mechanism such as a seat back adjusting and position locking device it often becomes necessary to vary the length of the actuator linkage to compensate for manufacturing tolerances, wear or structural requirements, and usually the linkage had to be replaced with one of suitable length.

The present invention eliminates the need for an inventory of different length linkages and provides a variable length linkage which is easily adjusted to suit any condition and is fully efficient in all adjusted positions.

Since relatively large pulling or pushing forces have to be transmitted through such linkage, any length adjusting device of this kind must necessarily establish a solid motion transmitting connection after each adjustment. This is accomplished in the invention by the provision of a special friction lock clamping device which securely clamps two relatively adjustable members of the adjusting linkage together as a unit. This clamping action can be overcome only by deliberately applied manual force during adjustment, but immediately after release of the manual force the clamping action is automatically restored due to a spring force incorporated in the clamping device.

Accordingly, the main object of this invention is the provision of an adjustable length linkage for a mechanism actuator and a novel locking and clamping device therefor which is so constructed and associated with the linkage that normally a solid motion transmitting connection is provided between adjustable members of the linkage which can only be overcome by deliberately applied manual force, but which, however, again locks the adjustable members together immediately upon release of the manual unlocking force.

Another object resides in the provision of an adjustable rod linkage in which two side-by-side separate rod members otherwise movable longitudinally with respect to each other are securely held against such movement by a spring loaded clamping device which frictionally grips both rod members.

A further object is the provision of a novel friction clamp of special construction and made of spring steel or the like to hold two otherwise relatively movable side-by-side rod members together as a unit so that if either a pushing or a pulling force up to a predetermined magnitude is exerted on the unit it will not change in length.

A further object of the invention is to provide a novel V-shaped spring metal clamp for releasably holding two side-by-side members in relative longitudinal positions.

Other novel features and advantages will become apparent from the following detailed description in connection with the appended drawings in which:

FIGURE 1 is a side elevation partially broken away and showing a vehicle seat frame assembly with an adjustable back mechanism having an adjustable actuator linkage for that mechanism according to a preferred embodiment of the invention;

FIGURE 2 is a sectional view showing one form of the adjustable lock mechanism of FIGURE 1;

FIGURE 3 is a fragmentary enlarged view of the special linkage locking device separate from the seat adjusting mechanism of FIGURE 1;

FIGURE 4 is a section through the linkage and locking device substantially along line 4—4 of FIGURE 3; and FIGURE 5 is an enlarged partially sectional view showing the locking clamp device of the invention and its action more in detail.

FIGURE 1 shows a tubular seat frame assembly 10 such as may be used for bucket seats in automobiles. The assembly 10 comprises a seating portion 12 and an associated back rest portion 14 which has adjustable inclination fore and aft relative to seating portion 12. To this effect back rest 14 is hinged at 16 on a bracket 18 welded or otherwise fixed to seat portion 12.

To tiltably adjust the back rest 14 either forwardly or rearwardly, a special linearly functioning adjusting mechanism 20 is provided comprising a tubular housing 22 provided at its upper end with a flange 23 by which it is pivoted at 24 to a rigid transverse rail 25 of the seat back. A rod 26 is longitudinally slidably mounted within housing 22, and at its lower end it projects through the housing wall to terminate in a flange 27 by which it is pivotally attached at 28 to a bracket 29 welded or otherwise secured to bracket 18 forwardly of pivot 16. Internal fixed plates 31 and 32 (FIGURE 2) provide slide guide support for rod 26.

A spring 33 within housing 22 surrounds rod 26 and is axially compressed between a flange 34 fixed to rod 26 and the lower end of housing 22 whereby rod 26 is constantly spring biased upwardly in the unit.

A stack of inclined friction lock plates 35 surrounds rod 26 and they are constantly biased into an inclined rod locking position by a coil spring 36, and in this position the lowermost plate of the stack bears against a pin 37 having offset aligned ends 38 journaled in the housing wall. Housing 26 and plates 35 are of rectangular contour so as to resist relative rotation about the axis of rod 26. Attached to one end 38 of eccentric pin 37 is a release lever 39 which may be manually actuated to rock eccentric pin 37 to tilt the lock plates 35 into non-locking position with respect to rod 26 to enable lengthwise adjustment of the unit 20 by permitting rod 26 to slide longitudinally of housing 22.

The construction and operation of mechanism unit 20 it preferably the same as that of my copending application Ser. No. 376,775 filed June 22, 1964, entitled Adjustable Back Seats, now matured into U.S. Letters Patent No. 3,271,071 dated Sept. 6, 1966, to which reference is made for more detail. Any suitable lockable mechanism controlled by a release lever such as that at 39 may be used at 20.

The adjustment unit 20 is longitudinally extendable to allow the back rest 14 to be inclined in various selected positions relative to the seat portion 12 and is normally locked to hold the back rest in the last selected position. In order to unlock the adjuster mechanism for changing the back rest inclination, lever 39 is rocked to temporarily release the inner lock at 35, and then release of lever 39 automatically relocks the adjuster unit 20 with back rest 14 in the new position.

The present invention is directed to a novel arrangement for actuating release lever 39 or like lock control element for the unit 20, and it comprises the longitudinally extensible linkage illustrated at 41 in FIGURE 1.

Linkage 41 consists essentially of two straight stiff rods 42 and 43 arranged in side-by-side parallel relation. The upper end of rod 42 is pivoted to lever 39 at 44. The lower end of rod 43 is pivoted at 45 to a bell crank lever 46 pivoted on the back rest frame at 47 and biased clockwise in FIGURE 1 by a spring 48. Manual lever 50 available to the seat operator of the vehicle is adapted to rock lever 46 about its pivot.

The double rod linkage 41 which is longitudinally adjustable to vary its length comprises the two substantially identical wire rods 42 and 43 which may be of substantially the same length with each of them shorter than the distance between the attaching points of the linkage at the release lever 39 and the bell crank 46.

Rods 42 and 43 overlap each other about midway between their ends in substantially parallel relation where they are secured together by a normally closed releasable friction clamp or clip 51.

Clamp 51, although normally establishing a solid connection between the rods 42 and 43 so that if a pulling or pushing force is exerted on either one of them they will move together as a solid rod, is releasable to allow the rods to be moved relatively longitudinally to vary the length of the linkage 41 to compensate for wear in the adjuster mechanism, manufacturing tolerances, installation requirements and the like. In operation when lever 50 is pushed downwardly release lever 39 is turned to unlock the adjusting device at 20.

Clamp 51 is preferably a one-piece element made from a flat piece of spring steel bent intermediate its ends into substantially V-shape with two diverging spring legs 52 and 53 extending equiangularly away from a rounded apex 54. The end section of one spring leg 52 is bent inwardly at about right angles to the leg towards the other leg and forms an abutment flange 55.

Spring legs 52 and 53 are formed with similar elongated openings 56 and 57 respectively at equal distances from apex 54. The width of openings 56 and 57 is slightly wider than the individual diameters of rods 42 and 43, and the length of openings 42 and 43 is slightly greater than double the individual diameters of rods 42 and 43, as shown in FIGURE 4, so that when these linkage rods are in assembled position extending through both openings 56 and 57 the rods will be positioned one alongside the other in close proximity with their longitudinal axes in a common plane; and they are held in this position by the closely determined dimensions of the openings 56 and 57 so that neither rod will be individually affected by bending stresses set up during push or pulling movement of the linkage.

The free, that is, unloaded condition of the spring clip 51 is indicated in broken lines in FIGURE 5 where it will be seen that the legs 52 and 53 must be compressed towards each other to axially align openings 56 and 57 and allow the rods 42 and 43 to be inserted therethrough in initial assembly. The length of abutment flange 55 is such that when it abuts leg 53, legs 52 and 53 will be parallel.

After the rods have been inserted through the opening and properly distanced longitudinally, manual compression on the spring legs is released allowing the legs to snap back toward their original free position. However, full return is prevented by the rods 42 and 43 which, since they are straight, tend to keep openings 56 and 57 aligned and the spring clip remains loaded with the spring legs gripping the rods.

Under this condition, as illustrated in FIGURE 5, the outer sharp edge 58 of opening 56 in leg 52 bites into the surface of the upper rod 42 and the inner sharp edge 59 of opening 57 bites into the surface of the lower rod 43. Likewise, the outer edge 61 of opening 57 bites into the surface of the upper rod 42 and the inner edge 62 of opening 56 bites into the surface of the lower rod 43. In this fashion, the spring clip 51 firmly locks both rods 42 and 43 together against any relative longitudinal movement in either direction.

The magnitude of the spring force of the clip 51 is such that it renders the clamped linkage strong enough to overcome the resistance afforded by the lock mechanism in the adjuster mechanism at 20 without pulling the rods 42 and 43 apart when a pushing or pulling force is exerted on the hand lever 50.

To release the rods 42 and 43 from being locked together by spring clip 51, manual force by means of a tool such as pliers may be exerted on the legs 52 and 53 to compress them towards each other to the dotted line position of FIGURE 5 to disengage the biting edges of the openings 56 and 57 from the rods and thus free the rods for relative longitudinal movement for length adjusting purpose of the linkage 41. This relative movement can be effected in the disclosed embodiment by rocking lever 50. In the foregoing, unit 20 can be reversed so that rod 26 is connected to the seat back.

When clip 51 is compressed to release the rods for relative adjustment, flange 55 not only serves to determine the optimum release position of the legs 52 and 53 but it prevents overstressing of the legs toward a permanently deformed condition from which it could not return to clamping engagement with the rods.

It will be clear that the above described device may find various other applications besides a seat back rest adjusting mechanism herein shown for illustration purposes only.

The present invention may be embodied in other forms without departing from the spirit and essential characteristics thereof, therefore, the present embodiment is to be considered in all respects as illustrative only and not restrictive the scope of the invention being indicated by the appended claims rather than by the foregoing description.

What is claimed and desired to be secured by Letters Patent is:

1. In an adjustable seat assembly comprising a seating portion, a back rest portion pivotally connected to said seating portion, and a normally locked mechanism for adjustably determining the angle of inclination of the back rest portion relative to the seating portion having a movable release member, an actuator linkage for connecting said release member to an operator device adjacent the seating portion comprising two rods having their opposite ends operatively connected to said release member and said operator device and side-by-side other ends disposed in relatively slidable association, and a releasable spring clamp mounted on and locking said rods together with sufficient force to prevent relative longitudinal displacement of said rods during transmission of an actuating force from said operator device to said release member.

2. In the adjustable seat assembly defined in claim 1, said rods being pivoted on fixed axes at said opposite ends to the release member and operator device respectively.

3. In the adjustable seat assembly defined in claim 2, said spring clamp being an integral sheet metal clip through which the adjacent ends of the rods project.

4. In the adjustable seat assembly defined in claim 1, said clamp being an integral strip of spring metal bent into substantally V-shape with opposite normally diverging legs apertured to pass said side-by-side rods the diverging spring action of said legs forcing the edges of said apertures into gripping relation with the rods.

5. In the adjustable seat assembly defined in claim 4, said legs when forced together releasing said rods, and means limiting movement of said legs toward each other.

6. In the adjustable seat assembly defined in claim 1, said linkage rods being of similar diameter and said spring clamp for holding said rods against relative longitudinal movement comprising a substantially V-shaped clip supported on said rods and having spring legs diverging from an apex, said legs being formed with similar and similarly located apertures through which pass said slidably associated rod ends, each of said apertures having a width approximately equal to the rod diameter and a length approximately equal to double the rod diameter and extending in the direction of the length of its leg, the longitudinal edges of said apertures being forced into biting engagement with the rods to lock the rods against relative movement when the clamp is released, and the rods being released from holding engagement by the clamp when said legs are compressed toward each other.

7. In the adjustable seat assembly defined in claim 1, said spring clamp being a one-piece unit and comprising a strip of spring metal bent to form an apex and two spring legs diverging from the apex, said legs being formed with similar rod receiving apertures that may be aligned when the legs are compressed toward each other to substantial parallelism and which spring out of alignment into linkage locking condition when released.

8. The spring clamp defined in claim 7 wherein said apertures are elongated in the direction of the length of each leg.

9. The spring clamp defined in claim 7, wherein one leg is inturned at its free end to form an abutment flange limiting movement of said legs toward each other.

10. The spring clamp defined in claim 7, wherein said legs diverge at equal angles from said apex, and said apertures are of the same size and located equidistantly from said apex.

References Cited

UNITED STATES PATENTS

| | | |
|---|---|---|
| 2,123,425 | 7/1938 | Kelly. |
| 2,295,685 | 9/1942 | Place. |
| 2,579,305 | 12/1951 | Cushman _____ 297—361 |
| 2,596,760 | 5/1952 | Bryant _____ 297—361 |
| 2,871,713 | 2/1959 | House. |
| 3,046,055 | 7/1962 | Martens _____ 297—361 |
| 3,271,071 | 9/1966 | Tabor _____ 297—375 |

BOBBY R. GAY, *Primary Examiner.*

G. O. FINCH, *Assistant Examiner.*